United States Patent [19]
Grill et al.

[11] Patent Number: 5,462,784
[45] Date of Patent: Oct. 31, 1995

[54] FLUORINATED DIAMOND-LIKE CARBON PROTECTIVE COATING FOR MAGNETIC RECORDING MEDIA DEVICES

[75] Inventors: Alfred Grill, White Plains; Vishnubhai V. Patel, Yorktown Heights, both of N.Y.

[73] Assignee: International Business Machines Corporation, Armonk, N.Y.

[21] Appl. No.: 333,405

[22] Filed: Nov. 2, 1994

[51] Int. Cl.[6] .................................................. H01F 10/02
[52] U.S. Cl. ..................... 428/65.5; 427/127; 427/131; 428/336; 428/692; 428/694; 428/900; 428/694 TF
[58] Field of Search ..................... 427/127–132, 427/599; 428/694, 695, 900, 928, 64, 336

[56] References Cited

U.S. PATENT DOCUMENTS 4,647,494  3/1987  Meyerson et al. ..................... 428/216
5,159,508  10/1992  Grill et al. ..................... 360/103

OTHER PUBLICATIONS

Micro–Tribological Studies on Fluorinated Carbon Films; S. Miyake, et al.; vol. 113, Apr. 1991; Transactions of the ASME; pp. 384–389.

Fluorohydrogenated amorphous carbon (a–C:H,F) films prepared by the r.f. plasma decomposition of 1,3–butadiene and carbon tetrafluoride; Jayshree Seth and S. V. Babu; Thin Solid Films, 230 (1993) 90–94; pp. 90–94 (no month available).

Primary Examiner—Bernard Pianalto
Attorney, Agent, or Firm—Dykema Gossett

[57] ABSTRACT

An improved wear-resistant protective coating for the surfaces of magnetic recording media devices that is formed of fluorinated diamond-like carbon and deposited by a plasma enhanced chemical vapor deposition process or other suitable methods to provide superior friction-reducing and stiction-reducing properties.

17 Claims, 1 Drawing Sheet

DISK

HEAD

FLUORINATED DIAMOND-LIKE CARBON PROTECTIVE COATING FOR MAGNETIC RECORDING MEDIA DEVICES

FIELD OF THE INVENTION

The present invention generally relates to thin film magnetic recording media devices such as magnetic disks and magnetic heads and more particularly, relates to thin film magnetic recording media devices that have an improved wear-resistant, low friction and low stiction protective coating applied thereon and a method of applying such coating to magnetic recording media devices.

BACKGROUND OF THE INVENTION

In the design of thin film magnetic recording media devices, it is important to provide a protective coating on the uppermost surface of the device to assure durability and reliability. Hydrogenated diamond-like carbon (DLC) is a hard, wear-resistant material that has a relatively low friction coefficient. It has been used as a protective coating in magnetic recording media devices such as thin film magnetic disks and magnetic recording heads.

For instance, U.S. Pat. No. 4,647,494 and U.S. Pat. No. 5,159,508 disclose the coating of a thin layer of hydrogenated carbon film onto a magnetic recording disk and a magnetic head slider, respectively. However, the method disclosed by both patents requires the application of an additional adhesion promoter layer onto the substrate before the final coating of the hydrogenated carbon can be applied. The patents therefore describe a two-stage deposition process. The tribological performance of these devices must be improved through the use of liquid lubricants on the surface of the protective DLC coating. In a modem recording device with reduced head-to-disk distance for increased recording densities, elimination of the extra lubricant layer is desirable. The removal of the liquid lubricant is also desirable for the elimination of capillary forces and meniscus formation which can cause increased stiction. The application of liquid lubricants to magnetic disk surfaces requires several processing steps, the elimination therefore reduces the manufacturing costs of such disks.

One method to eliminate the need of liquid lubricant is to further reduce the friction coefficient of the DLC coating. Such a method is disclosed by Miyake et al., in J. Tribol. Trans. ASME 113 (1991) 384. Approximately one micron thick of silicon-containing carbon films are first deposited by electron cyclotron resonance deposition and then the specimen surface is fluorinated by exposure to a $CF_4$ plasma. It was shown that surface fluorination of DLC can reduce the friction and microwear of DLC films. Since the fluorination process is performed subsequent to the deposition of the DLC film, the fluorination is limited to the uppermost layer of the coating. As the wear of the coating removes the fluorinated layer, its lubricating advantage is lost after a relatively short wear time. The advantage of fluorination could be extended if it occurs throughout the entire thickness of the protective layer to maintain wear resistance.

Fluorinated DLC films have been previously prepared by others. For instance, Seth et al., reported in Thin Solid Films, 230 (1993) 90 that high fluorine content of films leads to a large drop in density which indicates a comparatively open structure of the films. The films were found to be extremely soft and had no wear-resistance.

It is therefore an object of the present invention to provide a fluorinated DLC protective coating for magnetic recording media devices that does not have the shortcomings of other conventional protective coatings.

It is another object of the present invention to provide a fluorinated DLC protective coating for magnetic recording media devices that does not require the use of additional liquid lubricants on its surface in order to provide adequate wear-resistance.

It is a further object of the present invention to provide a fluorinated DLC protective coating for magnetic recording media devices that has superior wear-resistance throughout its entire coating thickness such that its wear-resistance property does not deteriorate with the wear of the uppermost layer.

It is another further object of the present invention to provide a fluorinated DLC protective coating for magnetic recording media devices that can be applied directly to the uppermost surface of the devices without an intermediate adhesion promoter layer.

It is yet another object of the present invention to provide a fluorinated DLC protective coating for magnetic recording media devices that has superior wear-resistance and reduced stiction properties.

It is yet another further object of the present invention to provide a fluorinated DLC protective coating for magnetic recording media devices that can be deposited in a plasma enhanced chemical vapor deposition chamber at temperatures below 250° C.

SUMMARY OF THE INVENTION

In accordance with the present invention, a fluorinated diamond-like carbon protective coating for magnetic recording media devices that can be applied by a deposition method of those used in depositing diamond-like carbon films is provided.

In the preferred embodiment, magnetic recording disks or heads are coated with a hard coating of fluorinated diamond-like carbon (FDLC) to provide wear-resistance and reduced friction and stiction. The FDLC films are prepared by plasma enhanced chemical vapor deposition (PECVD) on negatively biased substrates from mixtures of fluorinated hydrocarbons with hydrogen, preferably from fluorinated hydrocarbons with a large ratio of fluorine to carbon in the molecule such as hexafluorobenzene ($C_6F_6$) or pentafluorobenzene ($C_6HF_5$). Fluorinated carbon films having superior wear-resistance can be obtained through the right combination of a reactant gas mixture, plasma parameters and a bias voltage of the substrate. Since the films are fluorinated throughout the entire thickness, removal of surface layers through wear does not change the composition and the tribological properties of the protective film.

In an alternate embodiment, the FDLC film is deposited in combination with a thin intermediate layer of non-fluorinated diamond-like carbon (DLC). For instance, the thickness of the DLC layer can be approximately 4 nm combined with a 6 nm thickness of the top FDLC layer.

The present invention is further directed to a method of depositing fluorinated diamond-like carbon protective coatings or two-stage DLC/FDLC coatings on magnetic recording media devices by a plasma enhanced chemical vapor deposition technique.

BRIEF DESCRIPTION OF THE DRAWINGS

Other objects, features, and advantages of the present invention will become apparent upon consideration of the specification and the appended drawings in which.

DETAILED DESCRIPTION OF THE PREFERRED AND THE ALTERNATE EMBODIMENTS

The present invention provides a fluorinated diamond-like carbon protective coating for magnetic recording media devices that can be deposited by a plasma enhanced chemical vapor deposition method.

After the surface of a magnetic recording device is first prepared for coating, the device is loaded into a parallel plate plasma reactor and electrically connected to become one of the electrodes. After the reactor is pumped to a preset negative pressure, a suitable mixture of reactant gases of fluorinated hydrocarbon vapors and hydrogen is flowed into the reactor, while the pressure inside the reactor is controlled at a desirable value within the range between 30 mTorr and 300 mTorr. A DC or RF power is then applied to the electrodes of the reactor to ignite a plasma such that the device to be coated becomes negatively biased relatively to ground or to other parts of the reactor. The device is kept in the plasma until the required thickness of coating is obtained. A desirable coating thickness is in the range between 3 nm and 30 nm.

Figure 1:
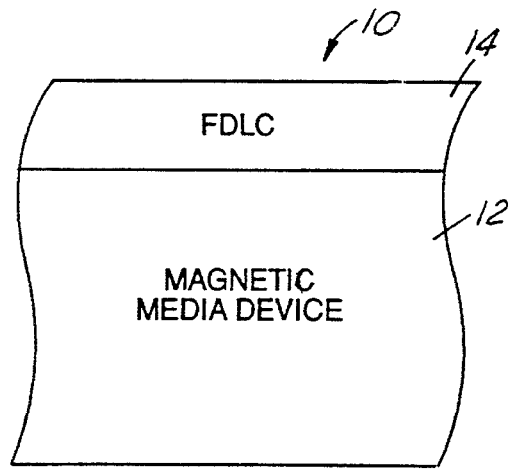
FIG. 1 is a schematic of an enlarged cross-sectional view of the upper layer of a recording device covered by a present invention wear-resistant FDLC coating layer.

Referring initially to FIG. 1, where a schematic of an enlarged cross-sectional view of the upper layer 12 of a recording device 10 is covered by a protective layer of wear-resistant FDLC 14. In a preferred embodiment of the invention, the thickness of the single FDLC layer 14 is approximately 10 nm. The film is deposited by a reactant gas mixture of $C_6F_6$ at a flow rate of 0.8 sccm and $H_2$ at a flow rate of 16 sccm. The chamber pressure during the reaction is maintained at 100 mTorr and the plasma is sustained with a DC power supply operated under voltage control. The device is connected to a bias voltage of −800 V DC.

Figure 2:
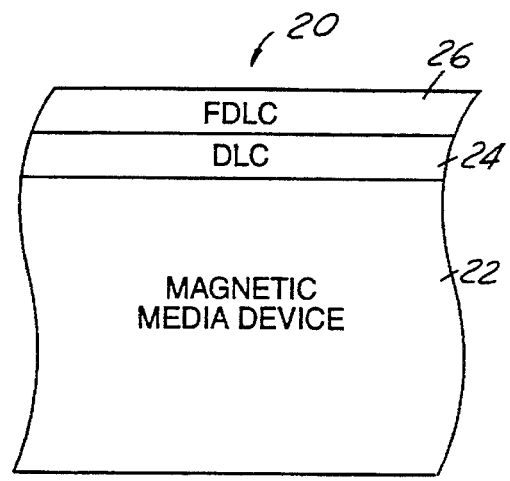
FIG. 2 is a schematic of an enlarged cross-sectional view of the upper layer of a recording device covered by a present invention intermediate layer of wear-resistant DLC and an upper layer of FDLC.

An alternate embodiment of the present invention is shown in FIG. 2. A schematic of an enlarged cross-sectional view of the upper layer 22 of a recording device 20 is coated by an intermediate layer 24 of wear-resistant DLC and an upper layer 26 of wear-resistant FDLC. In this embodiment, the thickness of the DLC layer 24 is approximately 4 nm combined with a thickness of the FDLC layer 26 of approximately 6 nm. In this alternate construction of the protective coating layers, a suitable thickness for the DLC layer is in the range between about 2 nm to 10 nm, while a suitable thickness for the top FDLC layer is in the range between 3 nm and 30 nm. The intermediate layer 24 of DLC can be deposited at similar conditions as that used in the deposition of the FDLC layer but replacing the gas mixture with 10 sccm of cyclohexane ($C_6H_{12}$).

Figure 3:
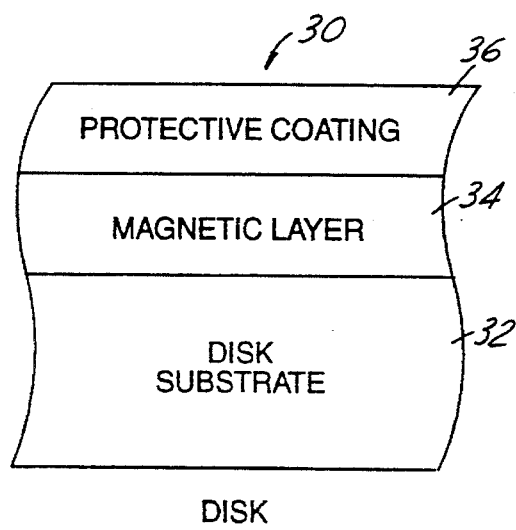
FIG. 3 is a schematic of an enlarged cross-sectional view of the upper layer of a magnetic disk covered by the present invention FDLC or DLC/FDLC protective coating.
Figure 4:
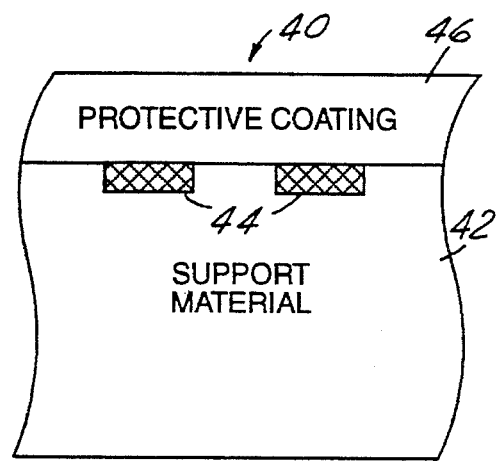
FIG. 4 is a schematic of an enlarged cross-sectional view of the active metallic layers of a read or write head and the support material protected by the present invention FDLC or DLC/FDLC coating layer.

FIG. 3 shows a schematic of an enlarged cross-sectional view of a magnetic recording disk 30 having a disk substrate 32 coated by a magnetic layer 34 which is in turn coated by the present invention FDLC layer 36. FIG. 4 shows a schematic of an enlarged cross-sectional view of a magnetic recording head 40 having a support section 42 including active read or write devices 44 that are coated by a present invention FDLC protective coating layer 46.

In another example of the deposition of FDLC films, the deposition process is carried out by using a reactant gas mixture of $C_6F_6$ at a flow rate of 0.8 sccm and $H_2$ at a flow rate of 16 sccm. The chamber pressure is maintained during the reaction at 30 mTorr while an RF power of 50 watts is applied to the electrode holding the device to be coated such that a bias voltage of about −350 V DC is obtained. A DLC coating can be deposited under similar conditions by replacing the gas mixture with 10 sccm of cyclohexane ($C_6H_{12}$).

The deposition temperature used in all examples is maintained at below 250° C. Under these deposition conditions, a deposition rate up to 70 nm/min can be obtained.

The protective films have been wear tested against a steel ball in a pin-on-disk tribotester. It was found that the wear resistance of the FDLC films is similar to that of non-fluorinated DLC films. For instance, using a pin made of 410C ball bearing steel of a diameter of 0.8 cm at a load of 11 gm, the depth wear rate is 0.07 to 0.5 nm/thousand rotations. However, the stiction property of the FDLC film is reduced compared to that of the DLC film, i.e. about 30% of that of the non-fluorinated DLC.

While the present invention has been described in an illustrative manner, it should be understood that the terminology used is intended to be in a nature of words of description rather than of limitation.

Furthermore, while the present invention has been described in terms of a preferred and an alternate embodiment thereof, it is to be appreciated that those skilled in the art will readily apply these teachings to other possible variations of the invention. For instance, other layer constructions of the DLC and FDLC films may be used and other coating methods may be employed to deposit the films while substantially achieving the same desirable results of the present invention.

The embodiments of the invention in which an exclusive property or privilege is claimed are defined as follows:

1. A magnetic recording media device having a wear-resistant and reduced-stiction fluorinated diamond-like carbon film as the uppermost protective layer.

2. A magnetic recording media device according to claim 1, wherein said device is selected from the group consisting of a magnetic recording disk, a magnetic read and write head, and other suitable recording devices.

3. A magnetic recording media device according to claim 1, wherein said film contains hydrogen at an atomic concentration between about 0 and about 40 atomic percent and preferably between about 0 and about 20 atomic percent.

4. A magnetic recording media device according to claim 1, wherein the atomic ratio of F/(F+C) in the film is between about 2 and about 70 atomic percent and preferably between about 10 and about 40 atomic percent.

5. A magnetic recording media device according to claim 1, wherein the thickness of said FDLC film is between about 4 nm and about 30 nm, and preferably between about 5 nm and about 10 nm.

6. A magnetic recording media device according to claim 1, wherein the wear resistance of said film is in the range between about 0.2 and about 1 of the wear resistance of a non-fluorinated diamond-like carbon film.

7. A magnetic recording media device according to claim 1, wherein said FDLC film is deposited directly on the surface to be protected.

8. A magnetic recording media device according to claim 1, wherein an intermediate diamond-like carbon film is deposited between the FDLC film and the surface to be protected.

9. A magnetic recording media device according to claim 8, wherein the thickness of said DLC film is between about 2 nm and about 10 nm, and preferably between about 3 nm and 5 nm.

10. A magnetic recording media device according to claim 8, wherein the thickness of said FDLC film is between about 3 nm and about 30 nm, and preferably between about 5 nm and about 7 nm.

11. A magnetic recording media device comprising:

a support structure having a magnetic material coated on its top surface, and a protective coating of a fluorinated diamond-like carbon material covering the uppermost surface of said magnetic material.

12. A magnetic recording media device according to claim 11, wherein said device is selected from the group consisting of a magnetic recording disk, a magnetic read and write head, and other suitable devices.

13. A magnetic recording media device according to claim 11, wherein an intermediate diamond-like carbon film is deposited between said FDLC film and the uppermost surface of said magnetic material.

14. A magnetic recording media device according to claim 11, wherein the thickness of said FDLC film is between about 3 nm and about 30 nm, and preferably between about 5 nm and about 10 nm.

15. A method of making a magnetic recording media device comprising the steps of:

depositing a magnetically active material on a support structure, said magnetically active material capable of storing information or read and write information, and depositing a protective coating of a fluorinated diamond-like carbon film on the uppermost surface of said magnetically active material.

16. A method of making a magnetic recording media device according to claim 15, wherein the thickness of said FDLC film deposited is between about 3 nm and about 30 nm.

17. A method of making a magnetic recording media device according to claim 15 further comprising the step of first depositing an intermediate DLC film on the uppermost surface of said magnetically active material and then depositing a FDLC film on top of said DLC film.

* * * * *